US005789523A

United States Patent [19]

George et al.

[11] Patent Number: 5,789,523
[45] Date of Patent: Aug. 4, 1998

[54] POLYIMIDE COMPOSITIONS WITH IMPROVED WEAR RESISTANCE AND FRICTION AT HIGH PV (PRESSURE × VELOCITY) CONDITIONS

[75] Inventors: Daniel Eugene George, Chaddsford, Pa.; Joy Sawyer Bloom, Wilmington, Del.; Thomas Paul Feist, Clifton Park, N.Y.

[73] Assignee: E. I. du Pont de Nemours and Company, Wilmington, Del.

[21] Appl. No.: 679,392

[22] Filed: Jul. 9, 1996

Related U.S. Application Data

[60] Provisional application No. 60/001,062 Jul. 11, 1995.
[51] Int. Cl.$^6$ .......................... C08G 73/10; C08G 69/00; C08L 79/08
[52] U.S. Cl. .................. 528/170; 528/310; 528/353; 524/404; 524/406; 524/423; 524/439; 524/496; 524/600; 524/602
[58] Field of Search ........................... 524/600, 602, 524/404, 423, 439, 406, 496; 528/170, 353, 310

[56] References Cited

U.S. PATENT DOCUMENTS

| | | | |
|---|---|---|---|
| 3,179,614 | 4/1965 | Edwards | 260/30.2 |
| 4,360,626 | 11/1982 | Manwiller | 524/495 |
| 4,622,384 | 11/1986 | Manwiller | 528/353 |
| 4,898,905 | 2/1990 | Kawakami et al. | 524/404 |
| 5,098,758 | 3/1992 | Kani | 428/37 |
| 5,346,969 | 9/1994 | Kaku | 525/432 |
| 5,416,149 | 5/1995 | Amano et al. | 524/423 |

FOREIGN PATENT DOCUMENTS

| | | |
|---|---|---|
| 62-132960 | 6/1987 | Japan . |
| 62188748 | 8/1987 | Japan . |
| 03210066 | 9/1991 | Japan . |

*Primary Examiner*—P. Hampton-Hightower
*Attorney, Agent, or Firm*—Lisa J. Moyles

[57] ABSTRACT

Polyimide compositions can be substantially improved by incorporating in the composition an inorganic, low hardness, thermally stable, sheet silicate, such as muscovite mica, talc, and kaolinite, which results in improved wear resistance and reduced coefficient of friction.

9 Claims, No Drawings

POLYIMIDE COMPOSITIONS WITH IMPROVED WEAR RESISTANCE AND FRICTION AT HIGH PV (PRESSURE × VELOCITY) CONDITIONS

This application claims the benefit of U.S. Provisional Application No. 60/001,062, filed Jul. 11, 1995.

BACKGROUND OF THE INVENTION

Polyimide compositions, such as those described in U.S. Pat. No. 3,179,614, may be used in a wide variety of commercial applications. The unique performance characteristics of polyimide compositions under stress and at high temperatures have made them useful in the form of bushings, seals, electrical insulators, compressor vanes and impellers, pistons and piston rings, gears, thread guides, cams, brake linings, clutch faces, and thrust plugs. Furthermore, blending polyimide compositions with polyamide and polyester resin compositions, such as those described in U.S. Pat. No. 5,346,969, are useful to form parts having a wider range of physical properties, such as improved high temperature performance, with the added benefit that they can be produced through injection molding.

Additionally, it is often desirable to incorporate various additives in such polyimide compositions and blends before fabrication into their final form. Accordingly, graphite has been incorporated into polyimides to improve the wear characteristics of such compositions in bearing applications, diamonds have been incorporated for abrasive applications, and fluoropolymers have been incorporated for lubricity in forming and extrusion of shapes.

Despite the variety of polyimide compositions and additives that have previously been available, there is a continuing need for polyimide compositions and blends which exhibit improved wear resistance and friction at conditions of high pressure and velocity, particularly when processed into the shape of bushings and bearings. Specifically, even with the incorporation of graphite as a lubricant in a polyimide, its friction at high PV (pressure x velocity) conditions can be too high to allow utility without excessive wear or catastrophic failure.

In the present invention, it was found that a polyimide composition containing an inorganic, low hardness, thermally stable, sheet silicate, even at low concentrations, greatly reduced its wear and friction against a steel mating surface at moderate PV values, compared with the same composition which contained no sheet silicate additive. Furthermore, it was found that the "PV limit", that is, the maximum PV value which a composition can tolerate without catastrophic failure, was increased several-fold, compared with the same composition which contained no sheet silicate. Likewise, it was found that blends of polyimide with polyamide and polyester resins exhibited greatly reduced wear and friction characteristics when a sheet silicate was incorporated into the composition.

SUMMARY OF THE INVENTION

The present invention resides in the discovery that the wear resistance and coefficient of friction at high pressure x velocity conditions of a polyimide composition can be substantially improved by incorporating in the composition from about 0.1 weight percent up to about 30 weight percent of at least one of an inorganic, low hardness, thermally stable, sheet silicate. The present invention, therefore, provides an improved polyimide composition which contains (a) about 70–99.9 weight percent of at least one polyimide and (b) about 0.1–30 weight percent of at least one of 0.1–30 weight percent of at least one of an inorganic, low hardness, thermally stable, sheet silicate sheet silicate. The present invention further provides an improved polyimide composition which is a blend of at least one polyimide with at least one other polymer which is melt processible at a temperature of less than 400° C. and is selected from polyamide and polyester resins, and the blend includes from 0.1 weight percent up to 30 weight percent of at least one of an inorganic, low hardness, thermally stable, sheet silicate. According to another aspect, the present invention is a method for improving wear resistance and reducing coefficient of friction of a polyimide composition, or a polyimide composition which is a blend of a polyimide with at least one other polymer as defined above selected from polyamide and polyester resins, wherein the method comprises incorporating into the composition from 0.1 weight percent up to 30 weight percent of an inorganic, low hardness, thermally stable, sheet silicate. In a preferred embodiment of the invention, the sheet silicate is present in the composition in the range of from 1 weight percent to 20 weight percent and the silicate is selected from the group consisting of muscovite mica, talc, and kaolinite.

DETAILED DESCRIPTION OF THE INVENTION

The composition of the present invention contains (a) from about 70–99.9 weight percent of at least one polyimide, but generally about 90–99 weight percent, and (b) and from 0.1–30 weight percent of at least one of an inorganic, low hardness, thermally stable, sheet silicate, said weight percents being based solely upon the weight of components (a) and (b). The present invention further contains a polyimide composition which is a blend of from 20–30 weight percent of at least one polyimide, from 45–79.9 weight percent of at least one polymer which is melt processible at a temperature of less than about 400° C. and is selected from polyamide and polyester resins, and from 0.1–30 weight percent of at least one of an inorganic, low hardness, thermally stable, sheet silicate.

A wide variety of polyimides are suitable for use according to the invention, including those described in U.S. Pat. No. 3,179,614, the teachings of which are incorporated herein by reference. The polyimides described therein are prepared from at least one diamine and at least one anhydride. Preferred diamines which can be used include m-phenylene diamine (MPD), p-phenylene diamine (PPD), oxydianiline (ODA), methylene dianiline (MDA), and toluene diamine (TDA). Preferred anhydrides which can be used include benzophenone tetracarboxylic dianhydride (BTDA), biphenyl dianhydride (BPDA), trimellitic anhydride (TMA), pyromellitic dianhydride (PMDA), maleic anhydride (MA), and nadic anhydride (NA).

Preferred polyimides include those prepared from the following combinations of anhydride and diamine: BTDA-MPD, MA-MDA, BTDA-TDA-MPD, BTDA-MDA-NA, TMA-MPD & TMA-ODA, BPDA-ODA, BPDA-MPD, BPDA-PPD, BTDA-4,4'-diaminobenzophenone, and BTDA-bis(p-phenoxy)-p,p'-biphenyl. An especially satisfactory polyimide useful in the present invention is that prepared from pyromellitic dianhydride and 4,4'-oxydianiline (PMDA-ODA).

The polyimide compositions of the present invention contain from about 0.1 to 30 weight percent of an inorganic, low hardness, thermally stable, sheet silicate, such as muscovite mica [$KAl_3Si_3O_{10}(OH)_2$], talc [$Mg_3Si_4O_{10}(OH)_2$], and kaolinite [$Al_2Si_2O_5(OH)_4$], and mixtures thereof. Sheet silicates of this kind have strong two-dimensional bonding within the silicate layers, but weak inter-layer bonding, which gives rise to lubricating characteristics of a platey compound such as graphite. For the purpose of this invention, the term inorganic is meant to include sheet silicates which occur naturally as well as those which may be synthesized in a lab. Low hardness is desirable to preclude abrasiveness toward the mating surface. Hardness is a mineral's ability to resist scratching of its smooth surface. Mohs Scale of Hardness is known to those skilled in the art to be the scale wherein talc has a hardness of 1 (least hard), and a diamond has a hardness of 10 (most hard). For the compositions of this invention, low hardness is understood to be less than 5. In addition, maintaining phase stability of crystal structure of the sheet silicates is critical, as is maintaining thermal stability of the sheet silicates' structural water at temperatures of up to 450° C., as shown by thermogravimetric analysis (TGA). Thermal loss of the structural water during processing of the polyimide composition can result in harm to polyimide integrity, and possibly change the crystal structure of the sheet silicate, giving a harder, more abrasive compound. Examples of sheet silicates which are not stable enough to be included in this invention are montmorillonite [(½Ca,Na)0.35(Al,Mg)$_2$(Si, Al)$_4$O$_{10}$(OH)$_2$.nH$_2$O], vermiculite [(Mg,Ca)0.35(Mg,Fe, Al)$_3$(Al, Si)$_4$O$_{10}$(OH)$_2$.4H$_2$O], and pyrophyllite [$Al_2Si_4O_{10}$(OH)$_2$]. Also, inorganic compounds which have a three-dimensional structure rather than a sheet structure, such as silica ($SiO_2$), barite ($BaSO_4$) and calcite ($CaCO_3$), do not have the beneficial effects of the compounds included in this invention.

Dramatic improvements in the wear and friction characteristics of the polyimide have been seen with about 1 weight percent of one of the sheet silicates. At amounts above about 30 weight percent, wear resistance can be affected because of an overall reduction in physical properties. Preferably, the compositions comprise about 0.1–20 weight percent of sheet silicate. Most preferably, the compositions comprise about 1–10 weight percent of sheet silicate.

The polyimide compositions of the present invention can also contain a blend of at least one polyimide with at least one other polymer which is melt processible at a temperature of less than about 400° C. and is selected from polyamide and polyester resin and may be present in a concentration of from about 45 to 79.9 weight percent. Melt processible is used in its conventional sense, that the polymer can be processed in extrusion apparatus at the indicated temperatures without substantial degradation of the polymer. Such polymers include polyamides or polyesters.

A wide variety of polyamides and/or polyesters can be blended with polyimides. For example, polyamides which can be used include nylon 6, nylon 6,6, nylon 610 and nylon 612. Polyesters which can be used include polybutylene terephthalate and polyethylene terephthalate.

A fusible or melt processible polyamide or polyester can be, and preferably is, in the form of a liquid crystal polymer (LCP). LCP's are generally polyesters, including, but not limited to, polyesteramides and polyesterimides. LCP's are described by Jackson et al., for example, in U.S. Pat. No. 4,169,933, 4,242,496 and 4,238,600, as well as in "Liquid Crystal Polymers: VI Liquid Crystalline Polyesters of Substituted Hydroquinones." The specific LCP used in the present invention is not critical, so long as the basic amide or ester moiety is present.

The present composition can further include other additives, fillers and dry lubricants which do not depreciate the overall characteristics of the finished polyimide parts, as would be evident to those skilled in the art. The additives may be present in an amount of up to about 60 weight percent based upon the total weight of the composition. In particular, the incorporation of graphite into the composition can extend the range of its utility as a wear resistant material. Another beneficial additive is carbon fiber for the purpose of reducing coefficient of thermal expansion.

In the preparation of the present compositions, the order of addition of components is not critical. The two basic components, the polyimide and the inorganic, sheet silicate, may be blended in the required quantities using conventional milling techniques. The sheet silicate may also be conveniently incorporated into the polyimide, as an alternative to milling, by blending into a polymer solution of polyimide precursors prior to precipitation as the polyimide. The lattermost preparation technique is preferred. Similar preparation methods may be used for blends of the polyimide, sheet silicate, and polyamide or polyester resin.

The polyimide compositions of the present invention, when processed into parts, are suitable for providing wear surfaces in the form of bushings, seals, thrust washers, compressor vanes and impellers, pistons and piston rings, gears, and cams, especially where the operating conditions involve high PV (pressure x velocity) conditions. The addition of 1–8 weight percent of a sheet silicate to a polyimide reduced its wear at a PV of 100,000 psi-fpm (3.5 MPa-m/s) by at least 10-fold, and as great as 35-fold, compared with the same polyimide without the sheet silicates. Such compositions also exhibited greatly reduced friction at this PV and higher so that the maximum PV which the pure polyimide could tolerate without failure was increased by at least 6-fold.

The blends of the present invention are useful in a wide variety of physical configurations, including, for example molded articles, films and fibers. The blends can be injection molded using conventional techniques which substantially broadens the applicability of the polyimides.

The present invention is further illustrated by the following specific Examples and Comparative Examples.

EXAMPLES

In each of the examples below, polyimide resins were prepared from pyromellitic dianhydride and 4,4'-oxydianiline, according to the procedures of U.S. Pat. No. 3,179,614 or U.S. Pat. No. 4,622,384. The indicated quantity of inorganic, sheet silicate and other additives were incorporated into the polymer solution prior to precipitation as the polyimide.

The resulting filled polyimide resin powder was converted into test specimens by direct forming at a pressure of 100,000 psi (689 MPa) at room temperature. The resulting parts were sintered for three hours at 400° C. under nitrogen at atmospheric pressure. After cooling to room temperature, the parts were machined to final dimensions for test specimens. The 0.25" (6.35 mm) wide contact surface of the wear/friction test block was machined to such a curvature that it conformed to the outer circumference of the 1.375" (34.9 mm) diameter x 0.375" (9.5 mm) wide metal mating ring. The blocks were oven dried and maintained dry over desiccant until tested.

Wear tests were performed using a Falex No. 1 Ring and Block Wear and Friction Tester. The equipment is described in ASTM Test method D2714. After weighing, the dry polyimide block was mounted against the rotating metal ring and loaded against it with the selected test pressure. Rotational velocity of the ring was set at the desired speed. No lubricant was used between the mating surfaces. The rings were SAE 4620 steel, Rc 58–63, 6–12 RMS. A new ring was used for each test. Test time was usually 24 hours, except when friction and wear were high, in which case the test was terminated early. The friction force was recorded continuously. At the end of the test time, the block was dismounted, weighed, and the wear calculated by the following calculation:

$$\text{wear volume(cc/hr.)} = \frac{\text{weight loss(grams)}}{\text{material density(g/cc)} \times \text{test duration(hrs.)}}$$

PV (pressure x velocity) limit tests were performed using the same Falex No. 1 Ring and Block Wear and Friction Tester. In these tests, wear blocks and rings already tested at a PV of 100,000 psi-fpm (3.5 MPa-m/s) were restarted at this same PV. At intervals of 15–20 minutes, the PV was increased in increments by increasing the velocity to a maximum of 1365 fpm (6.93 m/s), after which the load was increased until failure was achieved. Failure was defined as the rapid and uncontrollable rise in friction. The friction force was recorded continuously.

EXAMPLES 1 TO 15 AND COMPARATIVE EXAMPLES A AND B

In Examples 1 to 15, a polyimide resin prepared from pyromellitic dianhydride and 4,4'-oxydianiline, as described in U.S. Pat. No. 4,360,626, was precipitated in the presence of the sheet silicate additive present in such quantity as to yield the percentage sheet silicate shown in Table I. No other additives were present. In Comparative Examples A and B, a polyimide resin was prepared from pyromellitic dianhydride and 4,4'-oxydianiline, but contained no sheet silicate or other additives.

The samples were tested for wear and friction as described in the procedure above at PV's (pressure x velocity) of 100,000 psi-fpm (3.5 MPa-m/s) and 50,000 psi-fpm (1.75 MPa-m/s). At 100,000 psi-fpm, Examples 1 through 9, containing amounts of sheet silicate an improvement in wear rate of 10 to 35 times, compared with Comparative Example A containing no sheet silicate tested at the same conditions. The coefficient of friction of Examples 1 through 9 is less than one-half that of Comparative Example A. Moreover, the coefficient of friction range is much smaller, that is, more constant than that of Comparative Example A.

Similarly, at a PV of 50,000 psi-fpm, Examples 10 through 15, containing amounts of sheet silicate of 1.0 to 3.8 weight percent, show an improvement in wear rate of 6 to 20 times compared with Comparative Example B containing no sheet silicate tested under the same conditions. Again, the coefficient of friction of Examples 10 through 15 is less than that of Comparative Example B and the friction range is much smaller.

The test results are summarized in Table I.

TABLE I

| Ex. No | Sheet Silicate Additive | Wt. % | Polyimide Wear Volume cc × 10−4/hour | Coefficient of Friction Range |
|---|---|---|---|---|
| PV = 100,000 psi-fpm (3.5 MPa-m/s): 256 psi, 390 fpm (1.77 MPa, 1.98 m/s) | | | | |
| 1 | Kaolinite | 7.4 | 8.7 | 0.07–0.08 |
| 2 | Kaolinite | 3.8 | 8.7 | 0.09–0.11 |
| 3 | Kaolinite | 1.0 | 5.6 | 0.07–0.09 |
| 4 | Talc | 7.4 | 11.5 | 0.05–0.07 |
| 5 | Talc | 3.8 | 10.0 | 0.07–0.09 |
| 6 | Talc | 1.0 | 9.5 | 0.06–0.08 |
| 7 | Muscovite | 7.4 | 19.4 | 0.07–0.10 |
| 8 | Muscovite | 3.8 | 15.9 | 0.06–0.10 |
| 9 | Muscovite | 1.0 | 7.2 | 0.07–0.09 |
| A | None | 0.0 | 200.7 | 0.25–0.38 |
| PV = 50,000 psi-fpm (1.75 MPa-m/s): 190 psi, 268 fpm (1.30 MPa, 1.35 m/s) | | | | |
| 10 | Kaolinite | 3.8 | 4.9 | 0.11–0.12 |
| 11 | Kaolinite | 1.0 | 4.1 | 0.09–0.13 |
| 12 | Talc | 3.8 | 12.5 | 0.13–0.17 |
| 13 | Talc | 1.0 | 7.4 | 0.12–0.20 |
| 14 | Muscovite | 3.8 | 10.4 | 0.11–0.13 |
| 15 | Muscovite | 1.0 | 4.1 | 0.12–0.16 |
| B | None | 0.0 | 82.9 | 0.15–0.49 |

EXAMPLES 16 TO 29 AND COMPARATIVE EXAMPLES C TO H

The procedure for preparation of Examples 1–15 and Comparative Examples A and B was repeated for Examples 16–29 and Comparative Examples C-H, starting with pyromellitic dianhydride and 4,4'-oxydianiline monomers and including graphite and carbon fiber in some of the examples in addition to the sheet silicates.

Samples were tested for PV (pressure x velocity) limit, (denoted as "PV of Failure" in the tables below), as described in the procedure above. The polyimide containing no additives was not included as a Comparative Example since when tested at 100,000 psi-fpm (3.5 MPa-m/s), its high and variable friction showed that it was already at or above its PV limit. Examples 16–20 show that the inclusion of one of the sheet silicates, kaolinite, talc, and muscovite, gives a consistently low friction at high PV's and a PV limit of at least 700,000 psi-fpm (24.5 MPa-m/s). Examples 21 and 22 compared with Comparative Example C show that the sheet silicate addition to a composition containing 15 weight percent graphite increased its PV limit by about 2-fold. Examples 23–27 compared with Comparative Example D show that addition of a sheet silicate to a composition containing 37 weight percent graphite increased its PV limit by at least 3-fold. Examples 28 and 29 compared with Comparative Example E show that when carbon fiber is included as one of the components together with graphite, the PV limit is increased about 2-fold by the inclusion of a sheet silicate. Comparison of Examples 23–27 with Comparative Examples F–H show that the performance of compositions containing the thermally stable sheet silicates, kaolinite, talc, or muscovite is greatly superior to that of compositions containing one of the less stable sheet silicates, pyrophyllite and montmorillonite.

The test results are summarized in Table II.

TABLE II

| Ex. No | Silicate Additive | Wt. % | Other Additive | Wt. % | Coefficient of Friction Range Before Failure | PV of Failure kpsi-fpm (MPa-m/s) |
|---|---|---|---|---|---|---|
| 16 | Kaolinite | 8 | None | 0 | 0.09–0.13 | >700 (>24.5) |
| 17 | Kaolinite | 4 | None | 0 | 0.10–0.14 | >785 (>27.5) |
| 18 | Kaolinite | 1 | None | 0 | 0.09–0.11 | 700 (24.5) |
| 19 | Talc | 8 | None | 0 | 0.06–0.11 | 700 (24.5) |
| 20 | Talc | 4 | None | 0 | 0.08–0.14 | >875 (>30.6) |
| 21 | Muscovite | 20 | Graphite | 13 | 0.05–0.11 | 875 (30.6) |
| 22 | Kaolinite | 8 | Graphite | 14 | 0.08–0.12 | >875 (>30.6) |
| 23 | Kaolinite | 20 | Graphite | 31 | 0.03–0.08 | >700 (>24.5) |
| 24 | Talc | 20 | Graphite | 31 | 0.03–0.11 | >875 (>30.6) |
| 25 | Muscovite | 20 | Graphite | 31 | 0.03–0.06 | >700 (>24.5) |
| 26 | Kaolinite | 8 | Graphite | 34 | 0.03–0.12 | >875 (>30.6) |
| 27 | Talc | 8 | Graphite | 34 | 0.10–0.13 | >875 (>30.6) |
| 28 | Talc | 8 | Graphite C Fiber | 56 5 | 0.06–0.08 | 785 (27.5) |
| 29 | Muscovite | 5 | Graphite C Fiber | 57 5 | 0.06–0.13 | 700 (24.5) |
| C | None | 0 | Graphite | 15 | 0.16–0.18 | 440 (15.4) |
| D | None | 0 | Graphite | 37 | 0.11–0.25 | 250 (8.8) |
| E | None | 0 | Graphite C Fiber | 60 5 | 0.04–0.07 | 350 (12.3) |
| F | Pyrophyllite | 20 | Graphite | 31 | 0.11—0.11 | 150 (5.3) |
| G | Pyrophyllite | 8 | Graphite | 34 | 0.12–0.20 | 300 (10.5) |
| H | Montmorillonite | 20 | Graphite | 34 | 0.09–0.11 | 200 (7.0) |

EXAMPLE 30 AND COMPARATIVE EXAMPLES I TO K

For Example 30 and Comparative Examples I–K, a liquid crystalline polyester (i.e., Zenite 6000 as sold by E. I. du Pont de Nemours and Company) was blended with a sheet silicate additive and/or polyimide resin prepared from pyromellitic dianhydride and 4,4'-oxydianiline monomers, (present as its precursor, polyamic acid), in such quantity as to yield the percentages shown in Table III.

The composition was formed into a strand using a 30 mm twin screw extruder with barrels set to 290° C. and the die at 335° C. The strand was quenched using a water spray. The quenched strand was then cut into pellets using a standard rotating blade cutter. The pellets were molded into standard 6.4 mm thick tensile test bars as specified in ASTM D638 using a 160 ton injection molding machine with a barrel size of 170 g capacity. The molding profile was as follows:

| Rear | 313° C. |
|---|---|
| Center | 334° C. |
| Front | 335° C. |
| Nozzle | 332° C. |
| Boost | 1 sec |
| Injection | 20 sec |
| Hold | 20 sec |
| Injection Pressure | 3.4 MPa |
| Ram Speed | fast |
| Screw Speed | 107 rpm |
| Back Pressure | minimum |

The samples were made into the test specimens described above by machining. Testing for friction and for PV (pressure x velocity) limit was conducted as described in the procedure above, except that the samples were not previously tested specimens and the test was started at a PV of 12,500 psi-fpm. Example 30 shows that the inclusion of a sheet silicate into the polyimide/polyester blend gives a much improved (at least 2×) coefficient of friction over the polyester resin alone (Comparative Example I), the polyester/sheet silicate composition (Comparative Example J), and the polyester/polyimide blend with no sheet silicate (Comparative Example K). Additionally, the PV limit of 43,000 psi-fpm (1.51 MPa-m/s) of Example 30 is approximately 2× better than the Comparative Examples.

The test results are summarized in Table III.

TABLE III

| Ex. No | Polyimide Wt % | Silicate Additive | Wt % | Coefficient of Friction Range Before Failure | PV of Failure psi-fpm (MPA-m/s) |
|---|---|---|---|---|---|
| 30 | 28.5 | Kaolinite | 5 | 0.41–0.7 | 43,000(1.51) |
| I | 0 | Kaolinite | 0 | 0.75–0.80 | 25,000(0.88) |
| J | 0 | Kaolinite | 5 | — | <12,300(<0.43) |
| K | 30 | Kaolinite | 0 | 0.91–1.0 | 24,900(0.88) |

What is claimed is:

1. A polyimide composition, comprising:
   (a) about 70–99.9 weight percent of at least one polyimide,
   (b) about 0.1–30 weight percent of at least one sheet silicate, said sheet silicate having strong two-dimensional bonding within the silicate layers weak inter-layer bonding, said sheet silicate further being inorganic, wherein said sheet silicate has a Mohs hardness between 1 and 5, and further wherein said sheet silicate is thermally stable at temperatures of up to 450° C., and
   (c) 0–60 weight percent of a least one additive, wherein the additive may include up to 5 weight percent carbon fiber, said weight percents being based upon the weight of components (a), (b) and (c) only.

2. A composition according to claim 1, which is a blend wherein said polyimide is present in a range of about 20–30 weight percent and said blend further comprises about 45–79.9 weight percent of at least one other polymer which is melt processible at a temperature of less than about 400° C. selected from the group consisting of polyamide and polyester resins.

3. A composition according to claim 1 or claim 2 in which said sheet silicate is present in an amount of from 1–20 weight percent of the composition and is selected from the group consisting of muscovite, mica, talc and kaolinite.

4. A composition according to claim 1 further comprising at least one of additives, fillers or dry lubricants.

5. A method for improving wear resistance and reducing coefficient of friction of a polyimide composition which comprises incorporating into said composition from about 0.1 weight percent up to 30 weight percent of at least one inorganic, low hardness, thermally stable, sheet silicate and 0–60 weight percent of at least one additive, wherein the additive may include up to 5 weight percent carbon fiber.

6. The method of claim 5 in which said sheet silicate is present in a concentration of from 1 weight percent up to 20 weight percent and is selected from the group consisting of muscovite, mica, talc and kaolinite.

7. A molded article having improved wear resistance and reduced coefficient of friction made from the composition according to claim 1 or claim 2.

8. An injection molded article having improved wear resistance and reduced coefficient of friction made from the composition according to claim 1 or claim 2.

9. A molded article having improved wear resistance and reduced coefficient of friction made from the composition according to claim 1 or claim 2 selected from the group consisting of a bushing, seal, electrical insulator, thrust washer, compressor vane, impeller, piston, piston ring, gear, thread guide, cam, brake lining, and thrust plug.

* * * * *